June 17, 1941. C. C. FARMER 2,246,200
BRAKE SYSTEM
Filed May 31, 1939 2 Sheets-Sheet 2

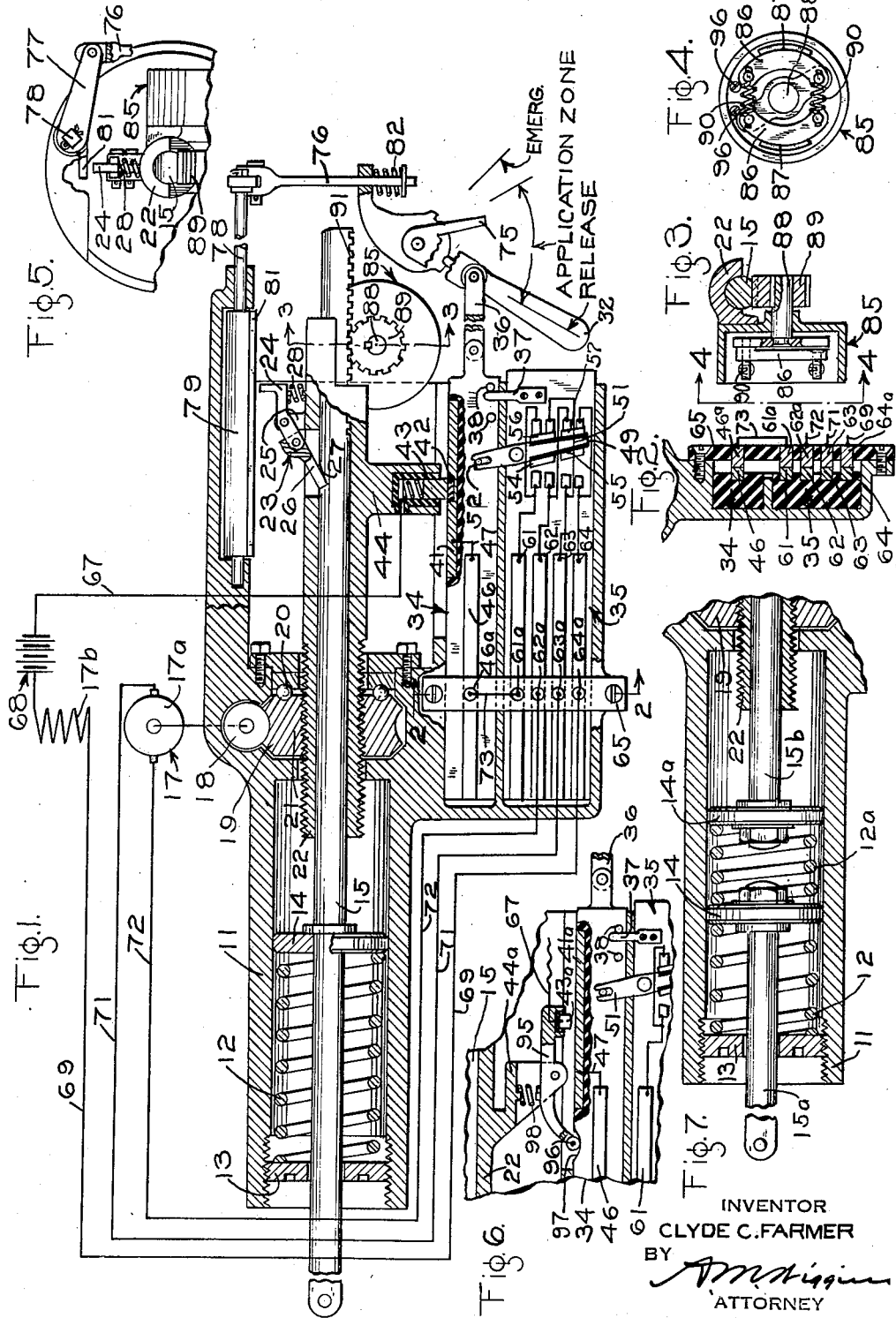

INVENTOR
CLYDE C. FARMER
BY
*[signature]*
ATTORNEY

Patented June 17, 1941

2,246,200

UNITED STATES PATENT OFFICE 2,246,200

BRAKE SYSTEM

Clyde C. Farmer, Pittsburgh, Pa., assignor to The Westinghouse Air Brake Company, Wilmerding, Pa., a corporation of Pennsylvania Application May 31, 1939, Serial No. 276,663

9 Claims. (Cl. 188—173)

This invention relates to brake systems for vehicle wheels or other rotating elements and has particular relation to brake systems having friction brake devices wherein the rubbing parts are urged into frictional engagement by resilient means such as a coil spring.

Frictional brake devices adapted to be applied by spring pressure have long been known. Various mechanical and electrical devices have been employed in the past for releasing the frictional brake devices, that is, moving the rubbing parts thereof out of engagement against the force of the spring pressure, such as for example, an air cylinder or an electric solenoid. Furthermore, the spring brake devices previously known have been of the "off-on" type, that is, adapted to be wholly released or fully applied to a maximum degree without graduation or variation of the degree of application.

It is an object of my present invention to provide a spring-applied brake mechanism which is adapted to be released by means of an electric motor.

Another object of my invention is to provide a brake mechanism of the spring-applied type wherein the application of the brake mechanism may be graduated, that is, wherein the brakes may be applied to any desired degree as distinguished from the "off-on" type of spring-applied brakes.

It is a further object to provide a brake mechanism of the spring-applied and electric motor release type having suitable provisions for enabling an immediate and rapid application of the brakes independently of the motor in the event of failure of the supply of power for the motor.

The above objects, and other objects of my invention which will be made apparent hereinafter, are obtained by several illustrative embodiments of my invention subsequently to be described and shown in the accompanying drawings wherein, Fig. 1 is a diagrammatic elevational view mainly in vertical section, of one embodiment of my invention, Figs. 2 and 3 are sectional views taken on the lines 2—2 and 3—3 respectively of Fig. 1, showing further details of construction, Fig. 4 is a view taken on the line 4—4 of Fig. 3, Fig. 5 is a fragmental end view of the apparatus shown in Fig. 1, Fig. 6 is a fragmental view showing a snap-acting switch adapted to be substituted for the sliding type switch shown in Fig. 1, Fig. 7 is a fragmental sectional view showing a modification of Fig. 1 adapted especially for a wide range of graduated application of the brakes, and Fig. 8 is a diagrammatic fragmental view, showing another embodiment of my invention.

*Description of embodiment shown in Fig. 1*

Figure 8:
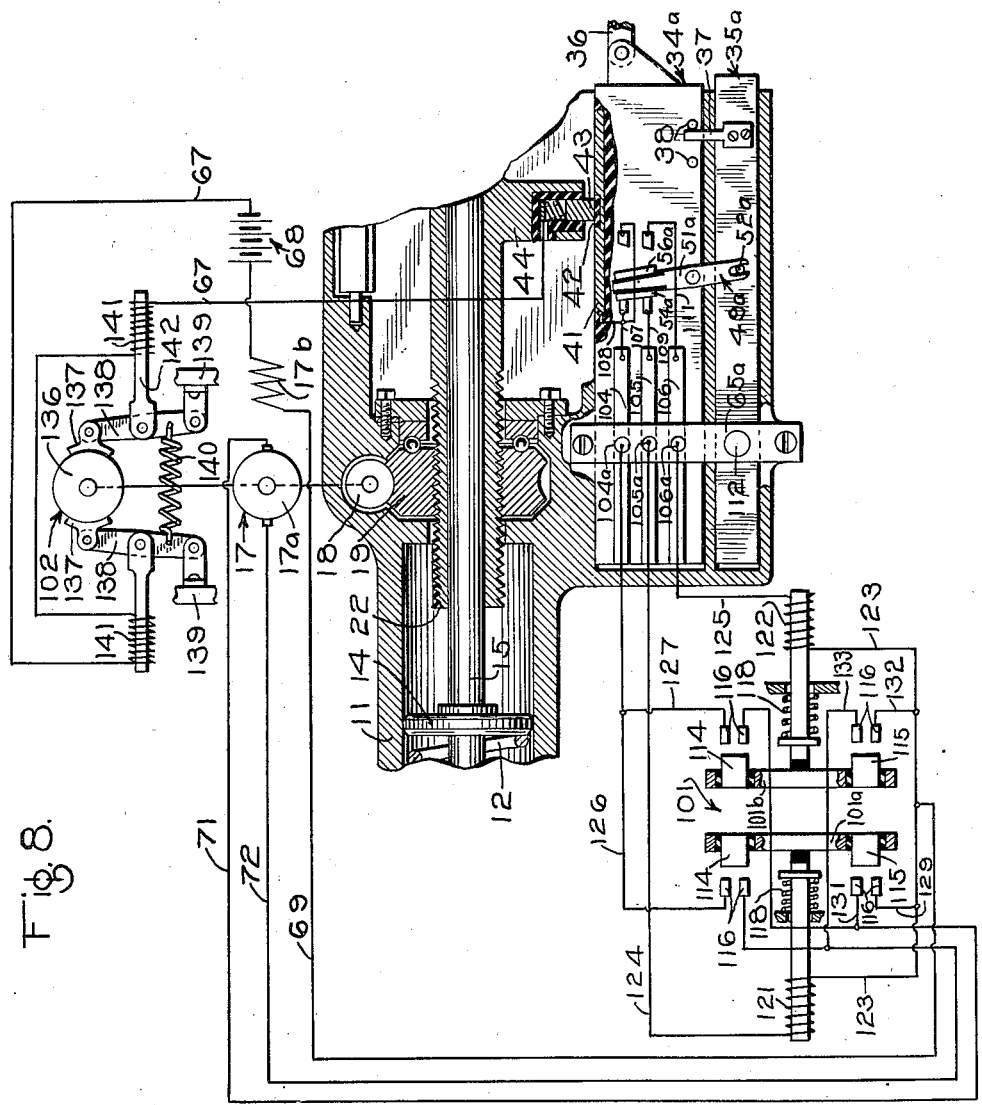

Referring to Fig. 1, the brake mechanism shown comprises a casing having a cylinder 11 containing a brake-applying spring 12 of the coil type, which is interposed between a threaded adjusting nut 13 screwed into the outer end of the cylinder 11, and a movable abutment such as a piston 14 fixed on a brake operating rod 15 and reciprocative in cylinder 11. The threaded nut 13 has a suitable central opening through which the operating rod 15 extends to the exterior of the cylinder 11. Although not shown, it will be understood that the outer end of the brake operating rod 15 is suitably connected so as to actuate the rubbing parts of brake devices into and out of engagement. In the case of a vehicle wheel brake system, such as a railway car wheel brake system, the outer end of the brake operating rod 15 is suitably connected to the usual brake-rigging levers.

The brake operating rod 15 is shifted in the left-hand direction against the force of the spring 12, to effect the release of the brakes, by means of a suitable electric motor 17, illustrated as of the direct-current series type, having a rotary armature 17a, including the usual winding, and a series field winding 17b. As indicated by the broken line, the motor 17 is connected to drive a worm 18, suitably journaled in the casing, that meshes with and correspondingly rotates a worm gear 19 likewise suitably mounted in the casing. As will be apparent later, the worm gear is subjected to the thrust of the spring 12 and accordingly a suitable thrust bearing 20 is provided in association with the worm gear 19. The worm gear 19 has a central threaded opening 21 and is adapted upon rotation to shift longitudinally in opposite directions an externally threaded sleeve 22, which has a screw relationship to the threaded inner opening 21 of the worm gear and which is suitably guided for longitudinal movement in the casing and prevented from rotating in a manner not shown. The pitch of the threads on the worm gear 19 and sleeve 21 is such that the worm gear cannot rotate in response to an axially exerted force on the sleeve. In other words, the sleeve is locked in position when the worm gear is stationary.

The threaded sleeve 21 has a smooth inner bore circular in cross-section through which the brake operating rod 15 extends with a close sliding fit.

The threaded sleeve 22 is normally locked to the brake operating rod 15 by a toggle or knuckle device 23 carried by the sleeve 22. The toggle device 23 comprises a small bell crank 24, that is pivoted on a suitable projecting lug 25 formed on the sleeve 22, and a pawl 26 which is pivotally connected to and cooperates with the outer end of one arm of the bell crank 24 in a manner so as to prevent pivotal movement of the pawl 26 with respect to the arm of the bell crank out of dead center position in one direction. The pawl 26 engages a suitabl notch 27 in the brake operating rod 15 and is normally maintained in dead center relation to the bell crank arm by a biasing spring 28 interposed between the sleeve 22 and the free arm of the bell crank 24. Accordingly, when the sleeve is shifted in the left-hand direction, the brake rode 15 is correspondingly shifted. Conversely, when the sleeve 22 is shifted to the right, the brake applying spring 12 urges the brake rod to the right as permitted by the movement of the sleeve.

When the bell crank 24 is rocked against the force of the biasing spring 28, the toggle or knuckle joint between the pawl 26 and bell crank arm is broken and the pawl 26 thus disengages the notch 27 in the brake operating rod 15. The brake operating rod 15 is thus free to move in the right hand direction with respect to the sleeve 22, so that application of the brakes may be effected without movement of the sleeve. This is an emergency feature which will be further explained hereinafter.

In view of the fact that the force of the spring 12 exerts an end thrust on the worm gear 19 through the brake rod 15 and sleeve 22 the necessity for the thrust bearing 29 at one side of the worm gear 19 will now be apparent.

The operating motor 17 is controlled by a manually operative brake lever or handle 32. Although shown in close proximity to the brake mechanism, it should be understood that the brake handle 32 may be located at a remote point, such as at a control station in a railway car, while the brake mechanism itself may be carried by the car wheel truck.

Carried in suitable grooves provided in a lateral extension of the casing, are two sliding members 34 and 35, the sliding member 34 being connected by a suitable link 36 to the brake handle 32 and being positioned at all times in accordance with the position of the brake handle 32.

The sliding member 35 has secured thereto a projecting lug or finger 37 which extends between two spaced lugs 38 formed on or attached to the sliding member 34. Thus, when the brake handle 32 is shifted in one direction or the other direction, the sliding member 34 is first shifted a certain amount until one of the lugs 38 engages the finger 37 and then both the sliding members 34 and 35 are moved together. The reason for this will be made apparent presently.

Carried in insulated relation by the sliding member 34 is a contact bar 41 provided at a point substantially midway between the ends thereof with an insert or segment of insulating material 42. Associated in operative contact with the contact bar 41 is a brush 43 which is carried by a suitable boss or extension 44 of the sleeve 22.

Also mounted in insulated relation on the sliding member 34 is a contact bar 46 which is constantly connected by a wire 47 to the contact bar 41.

The sliding member 35 carries a suitable reversing switch 49. The reversing switch 49 comprises an operating lever 51, hereafter called the switch lever, which is pivoted on the sliding member 35 and which is forked at one end to straddle a pin 52 formed on or attached to the sliding member 34. The movement of the sliding member 34 relative to the sliding member 35 to the extent of movement of the finger 37 between the two lugs 38 causes the switch lever 51 to be rocked from one position to an opposite position.

Carried in insulated relation on one edge of the switch lever 51 are a pair of separate contact members 54 and 55 each of which is adapted to engage and connect a corresponding pair of associated contact members carried by the sliding member 35 in one position of the lever 51. On the opposite edge of the lever 51 are carried, in insulated relation, a pair of contact members 56 and 57, each of which connects an associated corresponding pair of contact members carried by the sliding member 35 when the lever 51 is rocked to the opposite position thereof.

The sliding member 35 also carries in insulated relation four contact bars 61, 62, 63 and 64 which are respectively connected by wires to corresponding contact members of the reversing switch 49, as shown in Fig. 1.

A plurality of brushes 46a, 61a, 62a, 63a, 64a carried in a brush holding strap or member 65 attached to the casing slidably engage the contact bars 46, 61, 62, 63 and 64, respectively, and provide the necessary means of continuous electrical connection to the contact bar 41 of the sliding member 34 and to the reversing switch 49 on sliding member 35.

As seen in Fig. 1, the brush 43 is connected by a suitable wire 67 to one terminal of a source of direct current, such as a storage battery 68, which terminal for purposes of description will be assumed hereinafter to be the negative terminal of the battery. One terminal of the field winding 17b of the motor 17 is connected to the positive terminal of the battery 68 and the other terminal of the field winding is connected by a wire 69 to the brush 64a.

One terminal of the winding of motor armature 17a is connected as by a wire 71 to the brush 63a and the opposite terminal of the armature winding is connected as by a wire 72 to the brush 62a. The two brushes 46a and 61a are connected as by a strap or wire 73.

It will accordingly be seen that when the brake handle 32 is shifted in one direction or the other the reversing switch 49 is correspondingly operated and the brush 43 engages the contact bar 41. As will be explained in greater detail hereinafter, the motor armature 17a and series field winding 17b are thus energized in such a manner as to cause the sleeve 22 to follow in the direction in which the sliding member 34 is moved, the motor being stopped automatically when the brush 43 reengages the insulating segment 42 at the mid-section of the contact bar 41.

As shown, the brake handle 32 is in its normal or brake release position so that the brake operating rod 15 is correspondingly shifted a maximum degree in the left-hand direction to effect the release of the brakes. As the brake handle 32 is shifted in a counterclockwise direction from the position shown, it traverses a so-called "application" zone in which the spring 12 is gradually expanded until the full compressive force thereof becomes available to effect engagement of the rubbing parts of the brake devices, which occurs before the brake handle 32 reaches the end of the application zone.

If the circuit for controlling the motor 17 is accidentally interrupted or if for any other reason the motor becomes ineffective to move the sleeve 22 to permit the application of the brakes by the spring 12, it would be impossible to effect application of the brakes unless suitable mechanism were provided for accomplishing this. In order to enable the application of the brakes under the circumstances just described, the brake handle 32 it provided with an extension 75 which is adapted to engage the lower end of a rod 76 and to shift the rod upwardly against the yielding resistance of a biasing spring 82 associated with the rod, when the handle 32 is shifted beyond the extremity of the application zone to a so-called "emergency" position. The upper end of the rod 76 is pivotally connected to the outer end of an arm or lever 77 which is keyed or otherwise suitably fixed to rock shaft 78 suitably journaled in the casing at a point immediately above the toggle device 23. Fixed to the rock shaft 78 is a sleeve 79 which is provided with a laterally extending flange 81 that extends over the free end of the bell crank 24 of the toggle device 23. The biasing spring 82 is normally effective to maintain the flange 81 out of engagement with the free end of the bell crank 24.

When the extension 75 of the brake handle 32 shifts the rod 76 upwardly, the flange 81 engages the free end of the bell crank 24 to brake the toggle joint between the bell crank 24 and pawl 26 so that the spring 12 thus becomes effective to shift the brake operating rod 15 slidably in the sleeve 22 in the right-hand direction to effect application of the brakes without operation of the operating motor 17. It will be observed that the sleeve 79 on the rock shaft is sufficiently long to permit the engagement of the flange 81 with the bell crank 24 in any position of the threaded sleeve 22.

In order to prevent the spring 12 from shifting the brake operating rod 15 too rapidly in the right-hand direction when the toggle joint of the toggle device is broken, which would result in such sudden application of the brakes as to seriously shock and discomfort the passengers, a retarding device 85 is provided. The retarding device 85 is in the form of a centrifugally operated friction brake device having pivoted levers 86 provided with friction elements 87 thereon adapted to move outwardly, against the yielding resistance of biasing springs 90, and frictionally engage the surrounding circular inner surface of a circular casing upon rotation of the shaft 88 carrying the levers 86. The circular casing is attached as by a plurality of screws 96 to the threaded sleeve 22. The shaft 88 has a pinion gear 89 fixed thereon which meshes with a suitable gear rack 91 formed at one end of the brake operating rod 15.

Accordingly, it will be seen that when the toggle joint in the toggle device 23 is broken, the movement of the brake operating rod 15 relative to the sleeve 22 under the force of the spring 12 is frictionally retarded by the retarder 85 so as to prevent the too sudden application of the brakes.

*Operation of embodiment shown in Fig. 1*

With the brake control handle 32 in the release position as shown, the threaded sleeve 22 is shifted by the motor 17 to the position shown which is the extremity of movement in the left-hand direction. In this position of the threaded sleeve 22, the brake operating rod 15 is correspondingly shifted to effect disengagement of the rubbing parts of the brake devices. In the case of a vehicle brake device, such movement of the brake operating rod 15 is effective to move the brake shoes out of contact with the tread or rim of the vehicle wheel or other brake surface on the wheel.

To effect a full service application of the brakes, the operator shifts the brake handle 32 out of release position in a counterclockwise direction to the extremity of the application zone. The initial movement of the brake handle 32 causes shifting of the sliding member 34 in the right-hand direction, thus rocking the switch lever 51 of the reverser switch 49 from the position shown, in a clockwise direction, to its opposite position. Substantially at the time the contact members 54 and 55 on the switch lever 51 engage their associated pairs of contact members, the lug 36 on the slide member 34 engages the finger 37 on the slide member 35 and further movement of the brake handle 32 is accordingly effective to cause both slide members 34 and 35 to be moved simultaneously thereafter in the right-hand direction.

Upon the initial movement of the slide member 34 in the right-hand direction to a degree sufficient to effect disengagement of the contact members 56 and 57 on the switch lever 51 of the reversing switch 49 from their associated contact members, the brush 43 carried by the sleeve 22 runs off the insulating segment 42 and engages the left end of the contact bar 41 on the slide member 34. A circuit is accordingly completed for supplying current to the motor 17 and causing it to rotate in such a direction as to shift the sleeve 22 in the same direction that the slide member 34 moves, which in the case assumed is the right-hand direction. The circuit for energizing the motor 17 extends from the positive terminal of the battery 68 by way of the field winding 17b of the motor, wire 69, brush 64a, contact bar 64, contact member 55 of the reversing switch 49 and its associated pair of contact members, contact bar 63, brush 63a, wire 71, winding of the motor armature 17a, wire 72, brush 62a, contact bar 62, contact member 54 of the reversing switch and its associated pair of contact members, contact bar 61, brush 61a, wire 73, brush 46a, contact bar 46, wire 47, contact bar 41, brush 43 and wire 67 to the negative terminal of the battery 68.

As the threaded sleeve 22 is shifted in the right-hand direction by rotation of the worm gear 19, the force of the spring 12 becomes effective to shift the brake operating rod 15 a corresponding amount as permitted by the movement of the threaded sleeve 22 due to the engagement of the pawl 26 in the notch 27.

After a sufficient movement of the threaded sleeve 22 in the right-hand direction, the rubbing parts of the brake devices engage each other and thereafter the full force of the spring 12 becomes effective to cause their engagement. The maximum force of the spring may be varied by turning the adjusting nut 13 to different positions.

The motor 17 continues to rotate the worm gear 19 and cause the threaded sleeve 22 to be shifted in the right-hand direction until the brush 43 carried by the sleeve 22 again runs off the contact bar 41 on to the insulated segment 42 which interrupts the energizing circuit to the motor and results in the immediate stopping of the motor. In the case of a full service application this occurs after the full force of the spring 12 becomes effective to apply the brakes.

If it is desired to effect less than a full service application of the brakes, the operator moves the brake handle 32 only part way into the application zone. In such instance, the slide member 34 is correspondingly displaced a lesser amount from the position shown and consequently the brush 43 on the threaded sleeve 22 reengages the insulating segment 42 to cause stopping of the motor 17 before the brake operating rod 15 has moved sufficiently in the right-hand direction to permit the full force of the spring 12 to become effective to apply the brakes.

To effect release of the brakes, the operator returns the brake handle 32 to release position, which is the position shown in Fig. 1. In such case, the slide member 34 is first shifted in the left-hand direction without movement of the slide member 35 and the switch lever 51 of the reversing switch 49 is accordingly rocked in a counterclockwise direction into the position shown to effect engagement of the contact members 56 and 57 with their associated pairs of contact members. Substantially at the time the lever 51 of the reversing switch 49 attains the last mentioned position, the right-hand lug 38 on the slide member 34 engages the finger 37 attached to the slide member 35 and thereafter the two slide members 34 and 35 move together in the left-hand direction.

Just as in the case of an application of the brakes, so in the case of the release of the brakes, the lever 51 of the reversing switch 49 is shifted sufficiently to interrupt the circuit previously controlled thereby before the brush 43 engages the contact bar 41. Accordingly with the switch lever 51 rocked to the position shown in Fig. 1 and the slide member 34 shifted in the left-hand direction, a circuit is completed for energizing the motor 17 to cause it to rotate the worm gear 19 in such a direction as to cause movement of the threaded sleeve 22 in the left-hand direction so as to follow the direction in which the slide member 34 was moved.

This circuit for energizing the motor 17 extends from the positive terminal of the battery 68 through the motor field winding 17b, wire 69, brush 64a, and contact bar 64, to the reversing switch 49 as previously described, then extending by way of the contact member 57 of the reversing switch and its associated pair of contact members, contact bar 62, brush 62, wire 72, through the winding of the motor armature 17a in the reverse direction to that previously described, then by wire 71, brush 63a, contact bar 63, contact member 56 and associated pair of contact members of the reversing switch, contact bar 61, brush 61a, wire 73, brush 46a, contact bar 46, wire 47, contact bar 41, brush 43 and wire 67 to the negative terminal of the battery 68.

It will be observed that the reversing switch 49 was automatically effective to cause a reversal of the direction of flow of current through the winding of the motor armature 17a so that the direction of rotation of the motor 17 was accordingly reversed in well known manner.

The rotation of the worm gear 19 by the motor 17 continues until the brush 43 on the threaded sleeve 22 is shifted correspondingly in the left-hand direction into reengagement with the insulating segment 42 in the contact bar 41 to interrupt the energizing circuit of the motor.

This corresponds to the position of the threaded sleeve 22 and slide members 34 and 35 shown in Fig. 1 and, as previously stated, in such position the spring 12 is compressed and the brake operating rod 15 shifted in the left-hand direction to cause disengagement of the rubbing parts of the brake devices operated thereby.

If for some reason, such as failure of the source of current supply or accidental interruption of the electrical circuits, the motor 17 fails to respond when the brake handle 32 is shifted from the release position into the application zone to effect an application of the brakes, the operator may nevertheless effect an application of the brakes without any delay by shifting the brake handle 32 the full extent into emergency position. In the emergency position of the brake handle 32, the projection 75 on the handle engages the lower end of the rod 76 and raises it against the yielding force of the spring 82 to cause the flange 81 on the sleeve member 79 to be rocked downwardly into engagement with the free end of the bell crank 24 of the toggle device 23 to break the toggle joint between the bell crank lever 24 and the pawl 26. With the toggle joint thus broken, the spring 12 is effective to shift the brake operating rod 15 in the right-hand direction, while the threaded sleeve 22 remains stationary, to effect a full application of the brakes.

As previously explained, the retarder 85 is effective to dampen or retard the rapid movement of the brake operating rod 15 by the spring 12 to prevent a too sudden application of the brakes in this instance so that, in the case of vehicle brakes, undue discomfort and shock to passengers on the vehicle is avoided.

It will be seen that once an emergency application of the brakes has been effected, it is impossible to release the brakes until the defect in the motor circuit or the failure of power supply is remedied.

Assuming that the circuit defect or power failure is remedied the movement of the brake handle 32 to full service position will cause the motor to operate as in the previous case to shift the threaded sleeve 22 in the right-hand direction until the pawl 26 of the toggle mechanism passes to the right of the notch 27 in the brake operating rod 15. Then by restoring the brake handle 32 to release position, the return movement of the threaded sleeve 22 by the motor 17 automatically causes the pawl 26 to engage in the notch 27 and pick up the brake operating rod 15 so as to shift it in the left-hand direction and effect a release of the brakes as previously described.

If desired, a snap-acting switch device, such as shown in Fig. 6, may be substituted for the switch device comprising the brush 43 and the contact bar 41 of Fig. 1.

As shown in Fig. 6, the snap-acting switch device may comprise a switch lever pivotally carried by a depending yoke 44a provided on the threaded sleeve 22 in place of the boss 44 of Fig. 1. The switch lever 95 carries at one end an insulated contact member 43a adapted to engage a contact bar 41a on the slide member 34 and at the opposite end a small roller 96 which cooperates with an arcuate recess 97 formed in the upper surface of the slide member 34.

When the threaded sleeve 22 carrying the switch lever 95 occupies a predetermined position with respect to the slide member 34, the roller 96 at the end of the switch lever 95 is biased downwardly into the notch 97 of the slide member 34, by a biasing spring 98 interposed between the lever 95 and the yoke 44a, and the contact member 43a disengages the contact bar 41a. When the slide member 34 is shifted in one direction or the other with respect to the threaded sleeve 22 by means of the brake handle 32, the roller 96 on the end of the switch lever 95 rides up out of the notch 97 causing the contact member 43a at the opposite end of the lever to be snapped downwardly into sliding contact with contact bar 41a. The contact bar 41a differs from the contact bar 41 of Fig. 1 in that it does not have the insulating segment 42 midway of the opposite ends thereof.

The operation of an equipment having the snap-acting switch shown in Fig. 6 is in other respects identical with that shown in Fig. 1 and accordingly no further description of the operation is deemed necessary.

If desired, a further modification of Fig. 1 may be provided, as shown in Fig. 7. This modification consists in providing two coaxially aligned brake rods 15a and 15b in place of the brake operating rod 15 of Fig. 1 and interposing an additional coil spring 12a therebetween.

The brake rod 15a operates slidably in the central opening formed in the stationary adjusting nut 13 in the cylinder 11, the outer end of the rod 15a being connected to the brake rigging just as the outer end of the operating rod 15 was connected to the brake rigging. At its inner end, the rod 15a has fixed thereto a piston 14. The spring 12 is interposed between the nut 13 and piston 14, just as in Fig. 1.

The rod 15b is associated with the threaded sleeve 22 in the same manner as the corresponding portion of the operating rod 15 of Fig. 1. The end of the rod 15b that projects into the cylinder 11 is provided, however, with a movable abutment such as a piston 14a that is suitably fixed to the rod and operates in cylinder 11. The additional spring 12a is interposed between the two pistons 14 and 14a.

It will be understood that the operating rod 15b is shifted in the left-hand or right-hand direction, as seen in Fig. 7, by the motor 17 under the control of the brake handle 32 to vary the degree of compression of the spring 12a. With the brake handle 32 in its release position the spring 12a will thus be compressed to a maximum degree and consequently will exert a force on the piston 14 sufficient to overcome the spring 12 and shift the brake rod 15a in the left-hand direction so as to effect a release of the brakes. As the brake rod 15b is shifted in the right-hand direction from the position shown in Fig. 7, the compressive force of the spring 12a is relaxed, that is decreased, and the spring 12 accordingly becomes effective to shift the brake rod 15a in the right-hand direction to effect application of the brakes.

It will be apparent that if the brake rod 15b is shifted sufficiently in the right-hand direction, the force exerted by the spring 12a in opposition to the spring 12 may be reduced to a negligible amount so that the full force of the spring 12 becomes effective to cause application of the brakes.

If the brake rod 15b is shifted less than the full way in the right-hand direction from the position shown, the spring 12a remains effective to exert a counter-force in opposition to the force of the spring 12. Thus, depending upon the position of the brake rod 15b, the spring 12a may be so controlled as to exert a desired counter-force in opposition to the spring 12 so that the resultant force effective to urge the rubbing parts of the brake devices into frictional contact may be varied as desired.

This modification of Fig. 7 is advantageous in that it lends itself to a wider range of graduated applications of the brakes than does the embodiment shown in Fig. 1.

*Embodiment shown in Fig. 8*

Another embodiment of my invention is disclosed in Fig. 8 which differs from that shown in Fig. 1 in providing, in place of the slide members 34 and 35, two modified slide members 34a and 35a, corresponding respectively to the slide members 34 and 35, and a modified type of reversing switch 49a in place of the reversing switch 49 of Fig. 1. The embodiment in Fig. 8 differs further from that shown in Fig. 1 in adapting the reversing switch 49a to pilot a reversing contactor 101 and also in providing an automatically controlled brake device 102 for the operating motor 17 to insure immediate stopping of the rotor shaft of the motor upon interruption of the energizing circuit of the motor.

Those parts of the equipment shown in Fig. 8 which are identical counterparts to those described in Fig. 1 will be designated by the same reference numerals as in Fig. 1 and no description thereof will be given. Accordingly only those parts of the equipment shown in Fig. 8 which are not provided in Fig. 1 will be described.

It will be understood that the slide member 34a is adapted to be shifted to different positions by movement of the brake handle 32 and that the brush 43 cooperates with the contact bar 41 carried by the slide member 34a, just as in Fig. 1. It will also be understood that limited relative movement between the slide members 34a and 35a is effected by means of two lugs 38 on the slide 34a between which a finger 37 secured to the slide 35a extends.

The arrangement of the reversing switch 49a of Fig. 8 is somewhat different from the reversing switch 49 of Fig. 1, the operating lever 51a of the reversing switch 49a being pivoted on the slide member 34a and having its forked end straddling a pin 52a on the slide member 35a. The reversing switch lever 51a differs from the switch lever 51 of Fig. 1 in carrying only two contact members 54a and 56a in insulated relation on opposite edges thereof for engaging respectively associated pairs of contact members, fixed in insulated relation to the slide member 34a, in the two opposite positions of the switch lever 51a.

The slide member 34a carries in insulated relation thereon three parallel extending contact bars 104, 105, and 106 respectively which are adapted to be engaged by associated brushes 104a, 105a and 106a carried in insulated relation by the brush support 65a suitably attached to the casing.

The contact bar 104 is connected to the contact bar 41 and to one of the contact members of each of the two pairs in opposite positions of the reverser switch 49a by a wire 107 and branch wire 108. The contact bar 105 is connected by a wire 109 to the remaining contact member of the left-hand pair of the reverser switch 49a. In a similar manner, the contact bar 106 is connected by a wire 111 to the remaining contact member of the right-hand pair of the reversing switch 49a.

As distinguished from the slide member 35 of Fig. 1, the slide member 35a of Fig. 8 does not carry any contact bars. The brush support 65a, however, carries a friction element 112 which engages the side surface of the slide member 35a and offers frictional resistance to the movement thereof sufficient to insure movement of the slide member 34a relative to the slide member 35a and the consequent rocking of the reversing switch lever 51a from one position to the opposite position thereof upon movement of the brake handle 32.

The reversing contactor 101 is diagrammatically shown as comprising a pair of armatures 101a and 101b. Each armature carries in insulated relation two contact members 114 and 115 respectively. Each contact member 114 and 115 is adapted to engage in bridging relation an associated pair of stationary contact members 116 in the manner presently to be explained.

Associated with each of the armatures 101a and 101b is a biasing spring 118 which is arranged so as to urge the corresponding armature in a direction to cause the contact members 114 and 115 thereon to disengage from the respectively associated pairs of stationary contact members.

The armature 101a has associated therewith an actuating solenoid 121 which is effective when energized to actuate the armature against the yielding force of the spring 118 to effect engagement of the contact members 114 and 115 with their respectively associated pairs of stationary contact members 116. The armature 101b is similarly provided with an actuating solenoid 122.

Corresponding terminals of the two solenoids 121 and 122 are connected by a wire 123, which is in turn connected by the wire 69 to one terminal of the field winding 17b of the operating motor 17. The remaining terminal of the solenoid 121 is connected by a wire 124 to the brush 105a and the remaining terminal of the solenoid 122 is connected by a wire 125 to the brush 106a.

It will thus be apparent that the armatures 101a and 101b are selectively actuated, that is the actuating solenoids thereof are selectively energized, according to the position of the reversing pilot switch 49a.

The brush 104a is connected by a wire 126 to one of the stationary contact members 116 associated with the contact member 114 of the armature 101a and by a branch wire 127 of the wire 126 to a stationary contact member 116 associated with the contact member 114 of the armature 101b. The remaining stationary contact member 116 of the pair associated with the contact member 114 of the armature 101a is connected by wire 72 to one terminal of the winding of the motor armature 17a. The remaining contact member 116 of the pair associated with the contact member 114 of the armature 101b is connected by the wire 71 to the opposite terminal of the winding of motor armature 17a.

One contact member 116 of the pair associated with the contact member 115 of the armature 101a is connected by a branch wire 129 to the wire 123, the other stationary contact member 116 of the same pair being connected by a branch wire 131 to the wire 71.

One of the stationary contact members 116 of the pair associated with the contact member 115 of the armature 101b is connected by a branch wire 132 to the wire 123, the remaining contact member 116 of the same pair being connected by a branch wire 133 to the wire 72.

As will be explained in greater detail hereinafter, the reversing contactor 101 is accordingly adapted to control the direction of flow of current through the winding of the motor armature 17a to control the direction of rotation of the motor, just as did the reversing switch 49 of Fig. 1. The advantage of employing the reversing contactor 101 is that it may be specially designed and adapted to carry the motor current and to interrupt the current in the motor circuit so that the pilot switch 49a may be relatively small in size and current carrying capacity.

The brake device 102 for the operating motor 17 is illustrated diagrammatically as of the friction type having a brake drum or disc 136 fixed to an extension of the motor armature shaft, indicated by the broken line, and adapted to be frictionally engaged by a pair of brake shoes 137. As seen in Fig. 8, the brake shoes 137 are carried at one end of corresponding brake operating levers 138, the opposite ends of which are pivoted to a fixed support 139, and a tension spring 141 secured at opposite ends to the two brake levers 138 urges the levers toward each other so as to cause the shoes 137 to frictionally engage the brake drum 136.

Release of the brake shoes is effected, as diagrammatically shown, by a pair of brake release solenoid windings 141 associated with the two brake levers 138 respectively and adapted to shift the brake operating levers 138 against the force of the spring 141 through the medium of plungers 142 associated respectively with the solenoids.

As indicated in Fig. 8, the brake release solenoids 141 of the brake device 102 are connected in series relation in the wire 67 connecting the brush 43 to the negative terminal of the battery 68. Thus, as will be explained in greater detail presently, the solenoids 141 are energized to release the brake device 102 whenever the circuit of the motor 17 is closed and deenergized to effect application of the brake device 102 whenever the motor circuit is interrupted.

*Operation of equipment shown in Fig. 8*

As shown in Fig. 8, the slide member 34a is in the position corresponding to the release position of the brake handle 32 while the threaded sleeve 22 and brake operating rod 15 are correspondingly shifted to the left-hand extremity of movement thereof to effect the release of the brakes operated by the brake operating rod 15.

When the slide member 34a is shifted in the right-hand direction in response to the operation of the brake handle 32 out of release position to full service application position, slide member 34a is shifted relative to the slide member 35a and the reversing switch lever 51a is accordingly rocked in a clockwise direction from the position shown to its opposite position in which the contact member 56a bridges its associated pair of contact members. Separation of the contact member 54a from the associated pair of contact members occurs prior to the brush 43 engaging the contact bar 41. Accordingly, with the brush 43 engaging the left-hand end of the contact bar 41 and the reversing switch lever 51a rocked to its right-hand position, a circuit is completed for energizing the solenoid 22 of the reversing contactor 101, the field winding 17b of the operating motor 17 and the brake release solenoids 141 of the brake device 102. This circuit extends from the positive terminal of the battery 68 through the field winding 17b of motor 17, wires 69 and 123, solenoid 122, wire 125, brush 106a, contact bar 106, wire 111, contact member 56a and its associated pair of contact members of the reversing switch 49a, wire 108, contact bar 41, brush 43, wire 67, and solenoid windings 141 in series, to the negative terminal of the battery 68. The armature 101b of the reversing contactor 101 is accordingly actuated to effect engagement of the contact members 114 and 115 thereof with the respectively associated pairs of contact members 116, the field winding 17b of the motor 17 is energized, and the brake device 102 is released.

With the armature 101b of the reversing contactor 101 in its actuated position, the circuit for energizing the winding of motor armature 17a is completed. This circuit extends from the positive terminal of the battery 68 through the motor field winding 17b, wires 69, 123 and 132, contact member 115 and associated contact members 116 of the armature 101b, wires 133 and 72, winding of motor armature 17a, wire 71, contact member 114 of the armature 101b and associated pair of contact members 116, wires 127 and 126, brush 104a, contact bar 104, wires 107 and 108, contact bar 41, brush 43, and to the negative terminal of the battery 68 through the wire 67 and series related solenoid windings 141 of the brake device 102.

The field winding 17b and the winding of motor armature 17a are thus connected in series relation in a manner that the armature of the motor 17 is rotated in a direction to cause the threaded sleeve 22 to follow in the direction of movement of the slide member 34a, that is, in the right-hand direction. As in the embodiment shown in Fig. 1, the movement of the threaded sleeve 22 in the right-hand direction permits movement of the brake operating rod 15 in response to the force of the brake applying spring 12, which results in an application of the brakes.

The operating motor 17 continues to shift the threaded sleeve 22 in the right-hand direction until the brush 43 carried by the sleeve 22 runs off the contact bar 41 on to the insulating segment 42 to effect interruption of the circuit previously traced. The armature 101b of the reversing contactor 101 is instantly actuated to open position upon deenergization of the solenoid 122 and thus the interruption of the motor current is effected by the contact members 114 and 115 of the armature 101b, thereby avoiding the undesirable arcing at the brush 43 and the consequent pitting of the brush 43 and contact bar 41.

The deenergization of the solenoids 141 of the brake device 102 causes instantaneous application of the brake device to the shaft of the motor 17 and thus prevents any coasting of the motor armature shaft after interruption of the motor circuit. Accordingly, accurate and sensitive control of the position of the threaded sleeve 22 and accordingly accurate and sensitive control of the degree of application of the brakes is obtained. This is particularly true in the case of the modification of Fig. 1 shown in Fig. 7.

To effect the release of the brakes, the slide member 34a is shifted in the left-hand direction to the position shown. In this case, the initial movement of the slide member 34a relative to the slide member 35a causes the reversing switch member 51a to rock in a counterclockwise direction into the position shown, separation of the contact members 56a on the switch lever 51a from the associated pair of contact members occurring before the brush 43 engages the right-hand end of the contact bar 41.

With the brush 43 engaging the right-hand end of the contact bar 41 and the reversing switch lever 51a in the position shown, a circuit is completed for energizing the solenoid 121 of the reversing contactor armature 101a, the field winding 17b of the motor 17 and the solenoid windings 141 of the brake device 102. This circuit extends from the positive terminal of the battery 68 by way of the motor field winding 17b, wires 69 and 123, solenoid 121, wire 124, brush 105a, contact bar 105, wire 109, contact member 54a and the associated pair of contact members of reversing switch 49a, wires 107 and 108, contact bar 41, brush 43, 67 and solenoids, 141 of the brake device 102 to the negative terminal of the battery 68.

The motor brake device 102 is accordingly released and the armature 101a of the reversing contactor 101 actuated into its position for closing a series circuit through the winding of motor armature 17a and field winding 17b. The circuit of the motor armature winding extends from the positive terminal of the battery 68 through the motor field winding 17b and wires 69, 123 and 129 to one of the contact members 116 of the pair associated with the contact member 115 of the armature 101a, thence by way of the contact member 115, the other contact member 116, branch wire 131, wire 71, the winding of motor armature 17, wire 72, contact member 114 and associated pair of contact members 116 of the armature 101a, wire 126, brush 104a, contact bar 104, wires 107 and 108, contact bar 41, brush 43, and thence to the negative terminal of the battery 68 as previously traced.

It will be observed that the direction of flow of current through the motor armature winding is in the opposite direction to that occurring in response to the operation of the armature 101b of the reversing contactor and that consequently the armature of the motor 17 rotates in the opposite direction to cause the threaded sleeve 22 to be shifted in the left-hand direction.

As in the embodiment shown in Fig. 1, the movement of the threaded sleeve 22 in the left-hand direction picks up the brake operating rod 15 through the toggle device 23 to cause corresponding shifting of the brake operating rod 15 in the left-hand direction to effect the release of the brakes.

When the threaded sleeve 22 has shifted sufficiently in the left-hand direction, the brush 43 runs off the contact bar 41 on to the insulating segment 42, thus interrupting the motor circuit and the circuit of the solenoids 141 of the brake device 102. The supply of current to the motor 17 is accordingly interrupted by return of the armature 101a of the reversing contactor 101 to its circuit-opening position. Thus the motor 17 is stopped and the brake device 102 associated therewith is instantly applied.

Although not shown in Fig. 8, it should be understood that the toggle device 23 between the threaded sleeve 22 and the brake operating rod 15 is adapted to be broken by operation of the brake handel to an emergency position to permit application of the brake applying spring 12 in the event of failure of the battery 68 or accidental interruption of the motor circuit.

*Summary*

Summarizing, it will be seen that I have disclosed several embodiments of my invention together with several modifications thereof, in which the brakes associated with a rotary element are applied by the force of a spring and released by an electric motor.

Specifically, the electric motor drives a threaded sleeve through a worm and worm gear in opposite directions, the threaded sleeve being interlocked with a brake operating rod through a toggle device. The movement of the threaded sleeve in one direction permits the brake applying spring to become effective to shift the brake operating rod in a direction to apply the brakes. Conversely, the movement of the threaded sleeve in the opposite direction is effective to shift the brake operating rod against the force of the brake applying spring to effect release of the brakes. The relation of the threaded sleeve and driving worm gear is such that when the worm gear ceases to rotate the sleeve is locked in position. Thus, when the motor stops, the brakes remain applied or released depending upon the position of the brake operating rod.

Suitable mechanism is provided for breaking the toggle joint of the toggle device to permit the brake applying spring to shift the brake operating rod in a brake applying direction in the event of failure of the electric source of current for the motor or the motor circuit. To prevent the too sudden application of the brakes in such case, a retarder is provided for frictionally resisting movement of the brake operating rod.

A modified arrangement is also disclosed in which the force of the brake applying spring is opposed in varying degree by a second spring, the force of which is controlled by the electric motor through the threaded sleeve. This modification is especially adapted to permit a wide range of graduated application of the brakes.

In one of the embodiments disclosed, a spring-applied solenoid-released brake is provided for the operating motor to provide accurate control of the position of the threaded sleeve and correspondingly of the degree of application of the brakes since this prevents undesired movement of the operating motor after the energizing circuit therefor is interrupted. In this embodiment a reversing contactor is provided which is especially adapted to interrupt the motor circuit.

While I have disclosed certain specific embodiments of my invention it will be understood that various omissions, additions or modifications may be made therein without departing from the spirit of my invention. It is accordingly not my intention to limit the scope of my invention except as it is necessitated by the scope of the prior art.

Having now described my invention, what I claim as new and desire to secure by Letters Patent, is:

1. In a brake system, a brake operating member, a spring effective to exert a force urging the brake operating member in a direction to effect application of the brakes, an electric motor, a control member shiftable in one direction upon rotation of the said motor in one direction and shiftable in the opposite direction upon rotation of the motor in the opposite direction, means so relating the control member to the brake operating member as to cause movement of the brake operating member in a direction to effect release of the brakes upon movement of the control member in one direction and so as to permit shifting the brake operating member in a direction to effect application of the brakes by the said spring upon movement of the control member in the opposite direction, a circuit for energizing the motor, a manually operative member, a reversing switch device having two positions for so controlling the circuit of said motor as to cause rotation thereof in opposite directions when in the two positions respectively, and means effective to cause operation of said reversing switch to one position upon movement of the manually operative member in one direction and operation of the reversing switch to the other position upon movement of the manually operative member in the opposite direction whereby to automatically control the direction of rotation of the motors to cause it to shift the said control member in a direction to follow the direction of the movement of the manually operated member, and switch means including co-operating members on the manually operative means and on the control member for automatically causing the circuit of the motor to be interrupted when the control member is positioned according to the position of the manually operative member.

2. In a brake system, a brake operating member, a spring effective to exert a force urging the brake operating member in a direction to effect application of the brakes, a control member, power means for shifting said control member in opposite directions, interlocking means normally effective to render the said control member effective to move the brake operating member in a direction to effect release of the brakes upon movement of the control member in one direction and so as to permit movement of the brake operating member by the said spring in a direction to effect application of the brakes upon movement in the control member in the opposite direction, means including a manually operative means operative over a predetermined zone for controlling the operation of the power means to shift the control member in opposite directions and stop it in a desired position, and means effective upon movement of the manually operative means out of the normal operating zone for rendering the interlock means between the control member and the brake operating member ineffective so as to permit shifting of the brake operating member in a direction to effect application of the brakes under the force of said spring without movement of said control member.

3. In a brake system, a brake operating member, a spring effective to exert a force urging the brake operating member in a direction to effect application of the brakes, a rotary member rotatable in a fixed position and having a central internally threaded perforation, a threaded member cooperating with the threaded perforation of the rotary element in a manner to be moved longitudinally in one direction without rotation upon rotation of the rotary element in one direction and longitudinally in the opposite direction without rotation upon reverse rotation of said rotary element, a pawl carried by the threaded member arranged to act upon the brake operating member in a manner that movement of the threaded member in one direction causes the pawl to exert a force to shift the brake operating member in a direction to effect release of the brakes and movement of the threaded member in the opposite direction permits the spring to shift the brake operating member in a direction to effect application of the brakes to a degree permitted by the movement of the threaded member in that direction, the relation of the threaded member and the rotary element being such that the force of said spring exerted on the threaded member is ineffective to cause rotation of the rotary element.

4. In a brake system, a brake operating member, a spring adapted to exert a force urging the brake operating member in a direction to effect application of the brakes, a control member shiftable in opposite directions, power means for moving said control member, means normally effective to associate the control member with the brake operating member in a manner to cause movement of the brake operating member in opposition to the force exerted by said spring in a direction to effect release of the brakes upon movement of the control member in one direction and to permit movement of the brake operating member under the influence of said spring in a direction to effect application of the brakes upon movement of the control member in the opposite direction, and means for controlling said power means and operative also to render the last said means ineffective whereby to cause movement of the brake operating member by the said spring in a direction to effect application of the brakes without movement of said control member.

5. In a brake system, a brake operating member, a spring adapted to exert a force urging the brake operating member in a direction to effect application of the brakes, a control member shiftable in opposite directions, means normally associating the control member with the brake operating member in a manner to cause movement of the brake operating member in opposition to the force of said spring in a direction to effect release of the brakes upon movement of the control member in one direction and to permit movement of the brake operating member under the influence of said spring in a direction to effect application of the brakes upon movement of the control member in the opposite direction, means for rendering the last said means ineffective so as to cause movement of the brake operating member by the said spring in a direction to effect application of the brakes without movement of said control member, and means effective to impede movement of the brake operating member only upon movement of the brake operating member relative to said control member.

6. In a brake system, a brake operating member, a spring adapted to exert a force urging the brake operating member in a direction to effect application of the brakes, a control member shiftable in opposite directions, means normally associating the control member with the brake operating member in a manner to cause movement of the brake operating member in opposition to the force of said spring in a direction to effect release of the brakes upon movement of the control member in one direction and to permit movement of the brake operating member under the influence of said spring in a direction to effect application of the brakes upon movement of the control member in the opposite direction, means for rendering the last said means ineffective so as to cause movement of the brake operating member by the said spring in a direction to effect application of the brakes without movement of said control member, and friction means adapted to resist movement of the brake operating member only upon movement of the brake operating member relative to the said control member.

7. In a brake system, a brake operating member, a spring adapted to exert a force urging the brake operating member in a direction to effect application of the brakes, a control member shiftable in opposite directions, means normally associating the control member with the brake operating member in a manner to cause movement of the brake operating member in opposition to the force exerted by said spring in a direction to effect release of the brakes upon movement of the control member in one direction and to permit movement of the brake operating member under the influence of said spring in a direction to effect application of the brakes upon movement of the control member in the opposite direction, means for rendering the last said means ineffective so as to cause movement of the brake operating member by the said spring in a direction to effect application of the brakes without movement of said control member, and centrifuge operated brake means operative only upon movement of the brake operating member relative to the control member for retarding movement of the brake operating member.

8. In a brake system, a brake operating member, a spring adapted to exert a force urging the brake operating member in a direction to effect an application of the brakes, a control member shiftable in opposite directions, toggle means having a normally unbroken position and effective in such position to associate the control member with the brake operating member in a manner to cause movement of the brake operating member in opposition to the force exerted by said spring in a direction to effect release of the brakes upon movement of the control member in one direction and to permit movement of the brake operating member under the influence of said spring in a direction to effect application of the brakes upon movement of the control member in the opposite direction, and means adapted to cause operation of the toggle means to a broken position wherein movement of the brake operating member in a direction to effect application of the brakes is effected by said spring without movement of said control member.

9. In a brake system, a brake operating member, a spring effective to exert a force urging the brake operating member in a direction to effect application of the brakes, a control member, power means for shifting said control member in opposite directions, toggle means having a normally unbroken position in which it is effective to so associate the control member and brake operating member as to cause movement of the brake operating member in opposite directions to cause release or application of the brakes only in correspondence with the movement of the control member, and manually operative means for controlling said power means adapted also to effect operation of the said toggle means to a broken position wherein movement of the brake operating member in a direction to effect application of the brakes is effected by said spring without movement of the said control member.

CLYDE C. FARMER.